United States Patent
Rothschild

(10) Patent No.: US 8,473,514 B2
(45) Date of Patent: Jun. 25, 2013

(54) MEDIA VALIDATION SYSTEM

(75) Inventor: Leigh Rothschild, Miami, FL (US)

(73) Assignee: Schust Development LLC, Dover, DE (US)

( * ) Notice: Subject to any disclaimer, the term of this patent is extended or adjusted under 35 U.S.C. 154(b) by 0 days.

(21) Appl. No.: 13/523,684

(22) Filed: Jun. 14, 2012

(65) Prior Publication Data

US 2012/0271851 A1    Oct. 25, 2012

Related U.S. Application Data

(60) Continuation of application No. 13/280,267, filed on Oct. 24, 2011, now Pat. No. 8,219,590, which is a division of application No. 12/608,219, filed on Oct. 29, 2009, now Pat. No. 8,069,164, which is a continuation of application No. 11/226,561, filed on Sep. 14, 2005, now Pat. No. 7,631,000, which is a continuation of application No. 10/178,041, filed on Jun. 21, 2002, now Pat. No. 6,952,697.

(51) Int. Cl.
    *G06F 17/30* (2006.01)

(52) U.S. Cl.
    USPC ........... 707/781; 707/791; 707/802; 707/822; 707/828

(58) Field of Classification Search
    USPC ................................................. 707/600–899
    See application file for complete search history.

(56) References Cited

U.S. PATENT DOCUMENTS

| | | | |
|---|---|---|---|
| 6,044,374 A | 3/2000 | Nesamoney et al. | |
| 6,076,103 A | 6/2000 | Sakai | |
| 6,304,906 B1 | 10/2001 | Bhattia | |
| 6,366,915 B1 | 4/2002 | Rubert | |
| 6,438,601 B1 | 8/2002 | Hardy | |
| 6,952,697 B1 | 10/2005 | Rothschild | |
| 6,957,220 B2 | 10/2005 | Lamkin | |
| 6,978,021 B1 | 12/2005 | Chojnacki | |
| 7,318,061 B2 | 1/2008 | Rothschild | |
| 7,631,000 B2 | 12/2009 | Rothschild | |
| 8,069,164 B2 | 11/2011 | Rothschild | |
| 2002/0007313 A1 | 1/2002 | Mai | |
| 2002/0188566 A1 | 12/2002 | Inchalik | |
| 2003/0009468 A1* | 1/2003 | Lamkin et al. | 707/100 |
| 2004/0030643 A1 | 2/2004 | Madison | |
| 2012/0041981 A1 | 2/2012 | Rothschild | |

FOREIGN PATENT DOCUMENTS

| | | |
|---|---|---|
| EP | 1168762 | 2/2002 |
| WO | WO00/72649 | 7/2000 |

OTHER PUBLICATIONS

Derwent Account No. 1993-351, 917; Derwent Week 199733, Boebert, W E, Secure Computing Corp.
Stolowitz Ford Cowger LLP; Related Case Listing; Jun. 14, 2012; 1 Page.

* cited by examiner

*Primary Examiner* — Isaac M Woo
(74) *Attorney, Agent, or Firm* — Stolowitz Ford Cowger LLP

(57) ABSTRACT

A media validation system including a plurality of media storage devices which contain a quantity of content thereon, a user computer processor assembly structured to operatively access a select media storage device, a verification module, and a communicative link between the verification module and the user computer processor assembly. Each of the media storage devices includes a unique unit identifier, the verification module identifying the unique unit identifier of the select media storage device and receiving user information associated therewith. The verification module is also structured to apply a reward credit in association with only a first user whose user information is associated with the unique unit identifier for the select media storage device.

21 Claims, 2 Drawing Sheets

MEDIA VALIDATION SYSTEM

RELATED APPLICATIONS

The present application is a continuation of U.S. application Ser. No. 13/280,267, filed Oct. 24, 2011, which is a divisional of and claims the benefit of U.S. application Ser. No. 12/608,219, filed Oct. 29, 2009, now issued as U.S Pat. No. 8,069,164, which is a continuation of and claims the benefit of U.S. pending application Ser. No. 11/226,561 filed Sep. 14, 2005, now issued as U.S. Pat. No. 7,631,000, which is a continuation of and claims the benefit of U.S. application Ser. No. 10/178,041, filed Jun. 21, 2002, now issued as U.S. Pat. No. 6,952,697, all of which we incorporate herein.

BACKGROUND OF THE INVENTION

1. Field of the Invention

The present invention relates to a media validation system which can be utilized in association with any of a variety of types of media storage devices including DVD's and CD's, the validation system associating a user reward aspect in a manner which will require validation of an appropriate media storage device in order to obtain the reward, and in a manner which provides a disincentive to an original purchasing user to make or allow unauthorized copies and/or duplication of their media storage device, as that will jeopardize their reward benefit on an ongoing basis. Furthermore, the present validation system provides access to supplemental content, which may comprise the reward, thereby providing a further incentive to consumers to purchase authorized media storage devices in order to gain access to the rewards, including possibly the access to the supplemental content.

2. Description of the Related Art

In the software and entertainment industry, a substantial source of revenues comes from the actual sale of media content to consumers. This content may include audio only content, such as in the form of music, readings, games, etc., visual only content, such as including textual matters, or, as is becoming more common given the advances in technology, a combination of audio and video content. In order to effectively deliver the media content to consumers, media storage devices are typically employed to contain at least a substantial portion of the content. Furthermore, as technology advances, new and increasing types of media storage devices are being made available so as to enhance either storage capacity and/or quality of the delivery of the media content. Moreover, the media storage devices are often provided in a substantially compact and interchangeable fashion such that consumers may access the media content in any of a variety of locations, such as in an office computer, in a home computer, in a car, in a home entertainment system, etc.

Unfortunately, along with the advances that result in the field of storage devices, many advances have also come about with regard to means for copying the content from one media storage device to another. For example, most computers now commonly include CD copying hardware (CD burners), which in addition to the legitimate purpose of permitting consumers to make back-up copies of their data and media content for personal use, is also permitting users to make copies of various different types of media storage devices, including for example music CD's and/or CD-ROMS and/or games and game cartridges, etc., and providing them to other users, thereby avoiding the need for the other users to buy their own legitimate copy of the media content. Furthermore, in addition to CD's and CD-ROMs, many of which contain audio and video content, DVDs are becoming a very popular and very profitable type of media storage device utilized to provide high quality media content to users. Also, as can be appreciated, DVD copying devices and/or DVD copying software which copies a DVD's content to a CD-ROM or other device are becoming increasingly prevalent, and despite attempts at encryption of the DVD's and/or other encoding, the copying of DVD's, either onto another DVD or onto a CD-Rom is becoming increasingly facilitated thus, providing another source to circumvent the need to purchase the media content, while still obtaining substantially the same high quality as the original media storage device. Also, as such copying devices generally make substantially complete duplication of the content of a media storage device, even supplemental content and information which are now being provided on a variety of media storage devices so as to provide consumer incentives for purchase of the media storage device, are also being copied. Accordingly, this additional content provides an incentive for an initial purchaser of the media storage device, however, copyists who may have an increased desirability for the media storage device because of the additional content are not required to purchase an original based on the ability of the copying facilities.

As a result, it would be substantially beneficial to provide a media verification system which can provide consumers with substantial incentives to purchase their own media storage device containing the originally purchased media content, but which will also provide a strong disincentive to the original purchaser to make or allow others to copy the content of their media storage devices. Furthermore, such a system should help promote the sales of the media storage device, enhancing its attractiveness to consumers, and providing an additional marketing tool by which producers or distributors of the media storage devices, and especially the content thereon, can identify consumers and target them with advertising and further promotions.

SUMMARY OF THE INVENTION

The present invention relates to a media validation system. In particular, the present media validation system includes a plurality of media storage devices each containing a quality of content thereon. This content can be audio only, video only, audio/video, or any other type of content which consumers wish to purchase and/or utilize. Furthermore, the present system includes at least one user computer processor assembly that is structured to operatively access a select media storage device, preferably belonging to the user.

A verification module is also provided, and is communicatively associated with the user computer processor assembly, preferably via communicatively link therebetween. Of course, the communicative link can be a direct link and/or can be a link via another local or remote computerized network, including the Internet.

Each of the media storage device includes a unique unit identifier. Moreover, the verification module is structured to identify the unique unit identifier of the select media storage device being accessed utilizing the user computer processor assembly. The verification module is also structured to receive user information associated with the select media storage device having the unique unit identifier, maintaining that user information in association with the unique unit identifier for the select media storage device, and applying a reward credit in association with the user. The verification module, however, only provides the credit in association with a first user who's user information is associated with the unique unit identifier for the select media storage device, and as a result, users who are not the original purchasers of the media storage device will not be given the reward credit.

These and other features and advantages of the present invention will become more clear when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
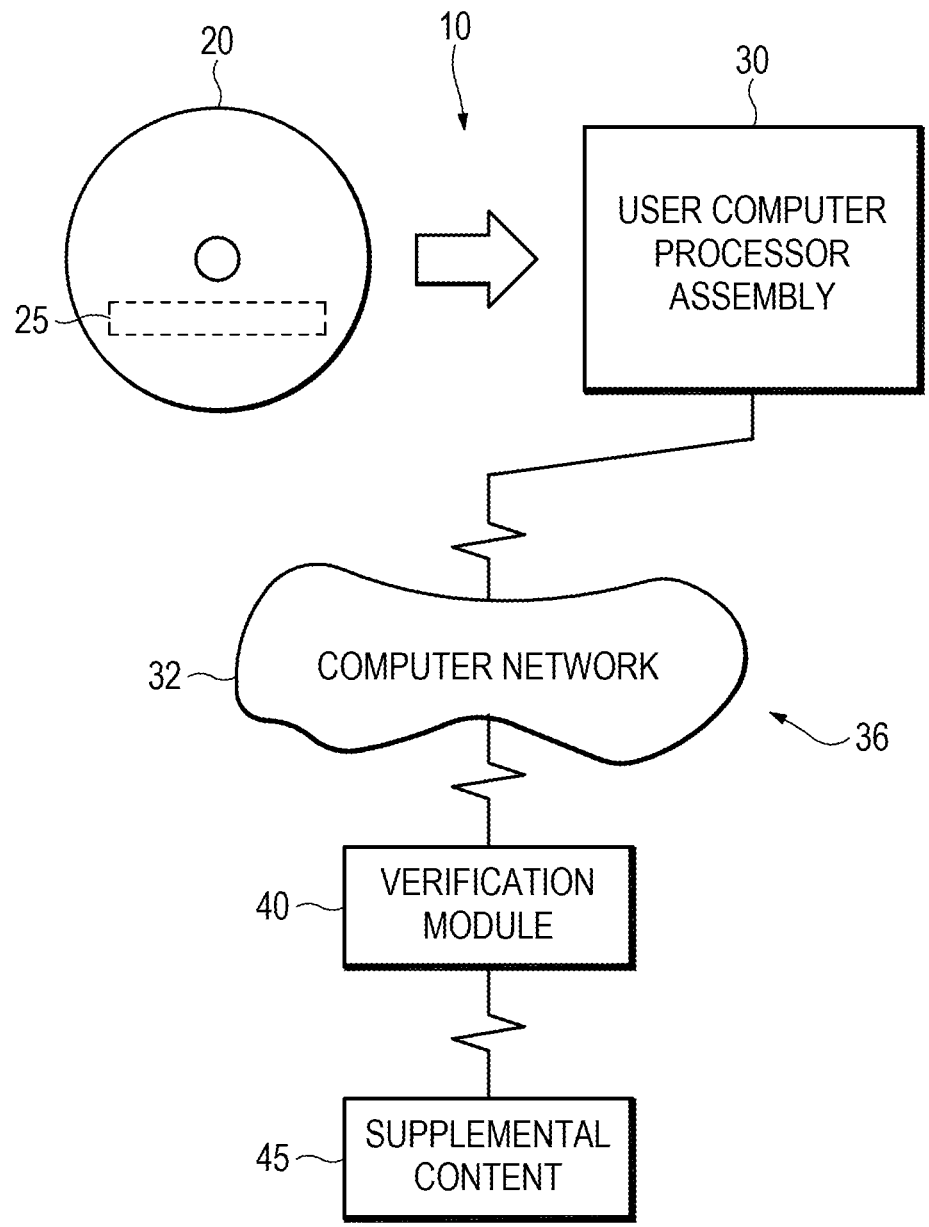
FIG. 1 is a schematic representation of one embodiment one of the media validation system of the present invention.
Figure 2:
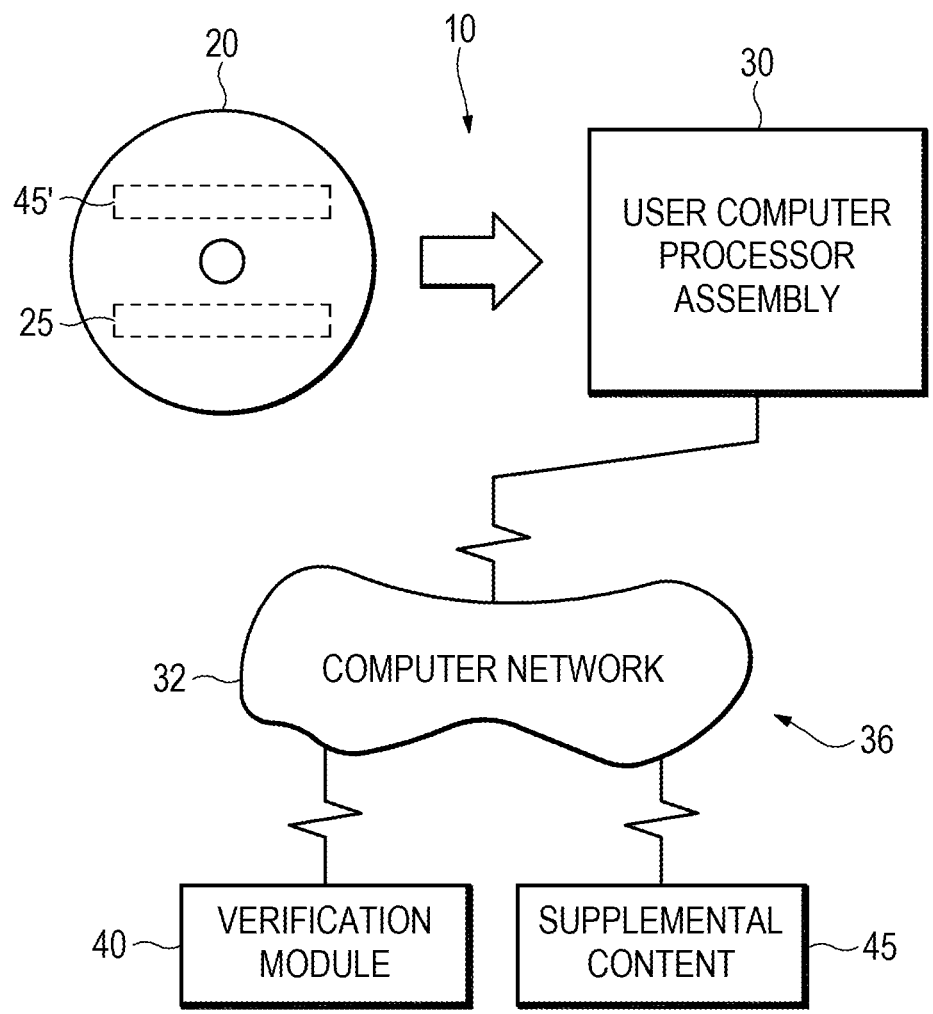
FIG. 2 is a schematic representation of yet another embodiment of the media validation system of the present invention.

Shown throughout the Figures, the present invention is directed towards a media validation system, generally indicated as 10. In particular, the media validation system 10 is structured to validate the authenticity of a media storage device containing a quantity of media content thereon, in a manner which will not hinder and/or impede the legitimate purchaser's use of the media storage device, and will provide them with enhanced benefits, while providing a disincentive to copying. As a result, the present media validation system 10 includes a plurality of media storage devices, generally 20. Each of the media storage device is structured to contain a quantity of content thereon, preferably in a generally conventional fashion. As a result, the media storage device may include any of a variety of available and to be developed media storage devices, including compact disks, CD-ROMs, DVDs, chip based storage devices, such as smart cards, sim chips and RAM memory cards, mini disks, portable hard drive type storage devices, etc. Similarly, the content to be contained thereon may be identical on a number of storage devices, and can include audio or visual only content and/or a combination of audio and visual content such as in the form of movies, music, documents, software, games, etc. in any of the widely accepted formats whether compressed, uncompressed, encoded, etc.

In addition to the media storage device(s) 20, the present media validation system 10 also preferably includes a user computer processor assembly, generally 30. The user computer processor assembly 30 may include a standard personal, desk top computer, lap top computer, terminal, workstation, handheld device, including PDAs, satellite or cable box or personal video recorders, telephones, etc., and/or an enhanced media player, such as an enhanced CD player, DVD player, etc. That may be connected to another processor, such as via the Internet. In this regard, the user computer processor assembly 30 is preferably structured to at least be capable of operatively accessing a select media storage device of a user, which will be the subject of validation. As a result, the computer processor assembly may receive and/or access the media storage device by a remote connection, a wireless or wired connection and/or in the case of CD-ROM's and/or DVD ROM's may be configured to merely receive and/or interact with the media storage device utilizing a corresponding drive or access assembly.

The present media validation system 10 further includes a verification module, generally 40. The verification module 40 is preferably, but not necessarily remote from the user computer processor assembly 30, and may be defined by or on a remote, local or integrated computer processor assembly. Preferably, however, a communicative link, whether external or internal, is further provided and structured to communicatively link the verification module and the user computer processor assembly that is operatively accessing the select media storage device. In the case of a remote verification module 40, the communicative link 36 may be established via a computer network 32 connection, such as the Internet, and/or via a direct or local network connection. As a result, appropriate interaction, at least in connection with validation of the select media storage device 20, can be achieved. Of course, it is recognized that this interaction via the communicatively link 36 may include the transmission of information between the user computer processor assembly 30 and the verification module 40, and/or the remote access of the select media storage device 20 by the verification module 40, either directly and/or by directing the actions of the user computer processor assembly immediately or at a later time.

Looking in further detail to the media storage device 20, each media storage device preferably includes a unique unit identifier 25 associated therewith. This unique unit identifier 25 may comprise any form of identifier, including alphanumeric identifiers, encoded identifiers, etc. which will give the media storage device its own unique identity. For example, in the case of an alphanumeric type of unique unit identifier, the unique unit identifier 25 may be associated with the specific content on the particular media storage device, thus allowing the same alphanumeric entry to be utilized for other media storage devices containing different content and still be a unique unit identifier. Of course, if desirable in some circumstances, the same unique unit identifier may be utilized for a plurality of media storage devices. Nevertheless, in the illustrated embodiment the unique unit identifier included for each media storage device will not be duplicated such that each selected media storage device can be individually identified. Furthermore, it is preferred that this unique unit identifier be appropriately associated with the content on the media storage device, such that a copy of the content to another media storage device will also copy the unique unit identifier therewith, and accessing that copy of a selected media storage device will result in identification of the same unique unit identifier. In this regard, the verification module 40 is structured to identify the unique unit identifier of the select media storage device via the communicative link 36. In doing so, the verification module 40 may directly access the selected media storage device 20 and/or may instruct the user computer processor assembly 30 to access the selected media storage device and retrieve, for identification, the unique unit identifier 25 therefore.

The verification module 40 is further structured to receive user information in association with the selected media storage device having the unique unit identifier. This user information may include any of a variety of types of information, including a users name or a random or anonymous user ID, however, in the preferred embodiments the user information will be information that can be utilized so as to effectively identify a particular user in connection with the present media validation system 10, as well as in connection with other promotional and/or informational matter, and/or access to supplemental content as will be described. For example, a user name and e-mail address may be appropriate in some circumstances. Furthermore, an appropriate cookie or other identifier may be provided so as to facilitate future, manual or automatic identification of the user, such as in connection with inquiries and/or other, different media storage devices. The verification module 40, either directly and/or via an associated computer processor assembly may also maintain this user information in association with the unique unit identifier, and therefore the select media storage device, storing it for later reference and/or utilization.

The verification module is additionally structured to apply a reward credit in association with a user whose user information is associated with the unique unit identifier for the select media storage device. Moreover, this reward credit is preferably applied only in connection with the first user. Looking further to the reward credit, this may be provided in any of a number of different formats. For example, in some embodiments of the present invention the reward credit may include an identified validation of the specific user so as to provide them with access to supplemental content, either on the select media storage device itself and/or at another location, such as via a download and/or on another accessible server. Further, in one illustrated embodiment the reward credit may include the application of points and/or a value in association with the specific user, the points and/or value being utilized for the receipt of a further benefit. For example, the reward credit may be a series points and/or dollar value credits which may be summed in association with a particular user for a variety of different media storage devices legitimately owned or purchased by the particular user, and once the total reward credit reaches a certain quantity, the user may be eligible for additional products, services, etc. As a result, a purchaser of the select media storage device will have a substantial incentive to validate their select media storage device, even if the content may be substantially available without validation, as this reward credit will be provided as a result of that validation process. Furthermore, consumers will be provided with a substantial incentive to purchase their own media storage device with its unique unit identifier, rather than making a copy of another, as only the first user to validate the selected media storage device will receive the reward credit. Naturally, as a particular user purchases more media storage devices and effectively validates them, the overall reward credit for them can increase, either permanently or until used or redeemed by the user. It is also noted, that the user will preferably be able to access information regarding their reward credit accumulation, such as through the use of a user identifier and accessing the verification module 40 or an associated processor containing the information. Also, the reward credits may be applied in association with certain entities or associations, such as a specific record label, movie studio, game company, etc., such that a user may accumulate different types of reward credits, and may accumulate or increase reward credits of a certain nature only by validating an appropriately affiliated media storage device. Accordingly, there may be an incentive to buy specific types of content or media storage devices to increase the accumulated reward credit.

As a further incentive to prevent the copying of a media storage device, the verification module 40 will also preferably be structured to identify and monitor subsequent validation requests in connection with a previously validated media storage device. In this regard, a validation attempt for the same physical media storage device and/or of another media storage device with the same content and the same unique unit identifier associated therewith will be considered a subsequent validation request of the select media storage device. When such a subsequent validation request is sought, however, and the verification module receives user information for a subsequent user in connection with the subsequent verification request, the verification module 40 is structured to remove any unused portion of an issued reward credit from the first user. As a result, if a legitimate purchaser and therefore the first user of a selected media storage device provides their media storage device to a third party for inappropriate copying and/or inappropriately copies for a third party, they risk losing the reward credit if a subsequent user of that copied media storage device attempts validation thereof. Of course, a subsequent validation request by the same user will preferably not result in an additional value or point type reward credit being issued.

Looking to a further embodiment of the media validation system 10 of the present invention, the reward credit to be provided to the first user may also include the providing of access to supplemental content. This access to the supplemental content, which can be provided in addition to or instead of a point or other value type of credit, is preferably provided so as to achieve a further incentive to purchase a media storage device and to obtain the necessary validation. In this regard, the supplemental content may include, in whole or in part, supplemental content 45' that is contained directly on the media storage device, but is, however, maintained in an encrypted and/or otherwise concealed format that is not readily accessible to the user absent validation with the verification module 40. Of course, any conventional means of encryption, encoding, concealment, etc. including those which require writing to the media storage device itself and/or which provide an encoded file and allow access to the supplemental content 45' in connection with a specific user computer processor assembly that contains a key, may be provided. Nevertheless, in any such embodiment, the verification module 40 is preferably structured to validate the selected media storage device and through this validation provide access to the supplemental content, such as upon receipt of the user information in association with the specific unique unit identifier for the select media storage device. If desired, the validation of the select media storage device by the verification module 40 may be achieved in a manner which requires validation each time access to the supplemental content is sought, and/or may be achieved in association with a specific user computer processor assembly such that subsequent access to the supplemental content in connection with the user computer processor assembly does not require re-validation. Nevertheless, in a preferred illustrated embodiment the verification module is preferably structured to only validate the select media storage device for the first user that seeks validation of the select media storage device, and upon the receipt of user information associate with a subsequent user, will preferably un-validate the selected media storage device. As such, further, future access to the supplemental content that requires validation is prevented. For example, in an embodiment wherein validation is required for each access to the supplemental content, un-validation may merely include a notation by the verification module 40 whereby when a future validation is sought for the select media storage device, even by the first user once again, the steps necessary for validation and allowing access to the supplemental content are not performed. In the case of a semi-permanent type of validation, such as in connection with the specific user computer processor assembly, the un-validation may include a removal and/or deactivation of a facility on the user computer processor assembly that allows subsequent access to the supplemental content. In this regard, the verification module 40 may check for any necessary un-validations on a specific user computer processor assembly in connection with a particular user when they attempt to achieve future validations of other selected media storage devices. Alternatively, a timed re-verification of the validation facilities that are put in place on a specific user computer processor assembly may be required such that after a selected period of time, if verification is not achieved such as due to the un-validation by the verification module 40, future access to the supplemental content cannot be obtained. As a result, an original purchaser of the media storage device will be provided with a disincentive to allow others to copy their media storage device, as that could restrict their future access to the supplemental content, and indeed other users will have an incentive to purchase their own media storage device, as that will be the only way they will be able to access the supplemental content. It is also noted in this and other embodiments that the validation and/or re-validation may merely include the identification of portions of the user information, such as a user name, in connection with the unique unit identifier, and/or another more complex and/or secure validation process that associates the user with the specific media storage device.

Looking to yet another embodiment illustrated in the Figures, the supplemental content which comprises all or a part of the reward credit may be maintained completely or partially remote from the select media storage device. This may include supplemental content that is to be downloaded to the user computer processor assembly, and/or as in the Figures may include supplemental content 45 in the form of alternative web sites and/or services that can be accessed either via the verification module 40, as in FIG. 1, and/or directly or via the communicative link. In particular, the supplemental content 45 may include a variety of different value added services and products, including previews of other content, interaction with other users of similar media storage devices containing the same or related content, games, contests, interactive viewings and/or question and answer sections with parties associated with the content on the media storage device, etc. Indeed, the variety of different types of supplemental content which may be offered in association with the select media storage device 20 may be rather large, and all function to provide a substantial incentive to purchase the media storage device in order to gain access to this supplemental content.

In such an embodiment wherein the supplemental content 45 is remote from the selected media storage device 20, the verification module 40 is structured to limit access to all or part of the supplemental content unless the select media storage device is validated, such as through identification of the user information and unique unit identifier. Moreover, the verification module is preferably structured to validate only a first user who's user information is obtained in association with the select media storage device and its unique unit identifier. Also, in such an embodiment, access to the supplemental content 45 may be achieved by the first user either in connection with the use and access of the select media storage device and/or independently, from any computer processor assembly, with or without the use of the select media storage device. The verification module 40, by identifying the first user, such as utilizing the user information and/or any additional user information and/or password, etc. which may be set for that first user can effectively regulate initial and later access to the supplemental content 45, either directly and/or indirectly by providing the necessary information and/or control to the operators and/or managers of the supplemental content 45. Additionally, however, the verification module 40 is structured to un-validate a select media storage device having a specific unique unit identifier, and thereby limit access to the supplemental content 45 upon receipt of user information for a subsequent user in connection with that select media storage device, which is indicative of a further validation request. For example, if a copy of a media storage device is made, and a subsequent user seeks access to the supplemental content, and thereby seeks validation of the select media storage device by the verification module 40, the verification module 40, by appropriately correlating the unique unit identifier for the select media storage device with the user information can effectively determined if a prior validation has already been achieved for the first user. Validation so as to allow access to the supplemental content 45 by the subsequent user, as well as possibly the first user during a future access, can therefore be denied to that supplemental user. Of course, if desired in this and all other embodiments, the verification module 40 may be programmed such that more than merely the first user can achieve validation, however, within the context of the present invention, it is preferably only the first user which can effectively receive a reward credit, such as in the form of access to the supplemental content.

As with the other embodiments of the present invention, when the supplemental content is available at least partially remotely from the select media storage device, the verification module 40 is preferably structured to un-validate the select media storage device having a specific unique unit identifier upon an attempted validation by a subsequent user. This un-validation will preferably function to prevent future access to the supplemental content by any user in connection with the select media storage device having the unique unit identifier, even the preferably the first user. As a result, a substantial disincentive is provided to the first user to prevent them from allowing copies of their select media storage device, as that may, in the future, limit their access to the supplemental content. Moreover, also in the preferred embodiment, so as to prevent the submission of common user information, and therefore the false designation of multiple users as the same first user, the verification module 40 may be further structured to un-validate the select media storage device having the unique unit identifier if more than one user is accessing or attempts to access any or select portions of the supplemental content in association with the same select media storage device having the unique unit identifier. As a result, in an embodiment wherein multiple users provide the same user information in order to gain access to the supplemental content in association with the same select media storage device, un-validation of the select media storage device, and therefore a restriction to future access to the supplemental content is achieved. Accordingly, a user who allows copying of their select media storage device will risk the loss of the access to the supplemental content if another user, utilizing a copied version of their select media storage device also accesses it the supplemental content. Indeed, as a further safe guard the verification module 40 may also be configured so as to un-validate, and possibly require re-validation of a select media storage device having a specific unique unit identifier after a predetermined period of time and/or when supplemental content becomes out of date. This allows the use of time sensitive information as the supplemental content. If a less restricted un-validation is desired, the verification module 40 may be configured so as to un-validate the select media storage device having the unique unit identifier for only a predetermined period of time. Naturally, appropriate controls may be implemented such that errors and/or other inappropriate un-validations and/or validations can be modified and/or corrected by the verification module. Moreover, the verification module, either directly and/or through interaction with the operators of the supplemental content 45 can maintain an effective, continuous update of users associated with a media storage devices having particular unique unit identifier in order to determine when unvalidation is appropriate.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A method, comprising:
validating a storage device having primary content stored thereon by associating the storage device to a unique identifier and to information identifying an initial user of the storage device; and
applying a reward credit to the initial user or allowing access to supplemental content associated with the primary content based at least in part on validating the storage device;
wherein the reward credit comprises points or value.

2. The method of claim 1, wherein the primary content stored on the storage device comprises publicly accessible content.

3. The method of claim 1, wherein the supplemental content comprises encrypted content supplemental to the primary content.

4. The method of claim 1, wherein the storage device comprises a compact disk, a CD-ROM, a DVD, a smart card, memory module, a memory card, or hard disk drive.

5. The method of claim 1, wherein the information comprises name, user identification, random identification number, email address, or password.

6. The method of claim 1, further comprising restricting access to the supplemental content to a user other than the initial user.

7. The method of claim 1, further comprising restricting access to the supplemental content based at least in part on a user other than the initial user attempting to copy the primary content stored on the storage device.

8. The method of claim 1, further comprising making at least a portion of the supplemental content inaccessible before validating the storage device.

9. The method of claim 1, wherein at least a portion of the supplemental content is stored remote from the storage device.

10. The method of claim 1, wherein applying the reward credit further comprises:
identifying an affiliation of the storage device; and
applying the reward credit based at least in part on the affiliation.

11. An apparatus, comprising:
a memory device configured to store instructions; and
a processing device configured to execute the instructions stored in the memory device to:
validate a storage device having primary content stored thereon by associating the storage device to a unique identifier and by associating the storage device to information corresponding to an initial user of the storage device;
apply a reward credit to the initial user based at least in part on validation of the storage device; and
allow access to supplemental content corresponding to the primary content exclusively to the initial user based at least in part on validation of the storage device;
wherein the reward credit comprises points or value.

12. The apparatus of claim 11, wherein the primary content stored on the storage device comprises publicly accessible content.

13. The apparatus of claim 11, wherein the supplemental content comprises encrypted content supplemental to the primary content.

14. The apparatus of claim 11, wherein the storage device comprises a compact disk, a CD-ROM, a DVD, a smart card, memory module, a memory card, or hard disk drive.

15. The apparatus of claim 11, wherein the information comprises name, user identification, random identification number, email address, or password.

16. The apparatus of claim 11, further comprising restricting access to the supplemental content to a user other than the initial user.

17. The apparatus of claim 11, wherein the processing device is further configured to execute the instructions stored in the memory device to restrict access to the supplemental content to a user other than the initial user.

18. The apparatus of claim 11, wherein the processing device is further configured to execute the instructions stored in the memory device to restrict access to the supplemental content based at least in part on a user other than the initial user attempting to copy the primary content stored on the storage device.

19. The apparatus of claim 11, wherein the processing device is further configured to execute the instructions stored in the memory device to restrict access to at least a portion of the supplemental content inaccessible before validating the storage device.

20. The apparatus of claim 11, wherein at least a portion of the supplemental content is stored in a remote storage device located remotely from the storage device.

21. The apparatus of claim 11, wherein the processing device is further configured to execute the instructions stored in the memory device to:
identify an affiliation of the storage device; and
apply the reward credit based at least in part on the affiliation.

* * * * *

UNITED STATES PATENT AND TRADEMARK OFFICE
CERTIFICATE OF CORRECTION

PATENT NO. : 8,473,514 B2
APPLICATION NO. : 13/523684
DATED : June 25, 2013
INVENTOR(S) : Rothschild Page 1 of 1

It is certified that error appears in the above-identified patent and that said Letters Patent is hereby corrected as shown below:

On the Title Page, in Column 1, under "Related U.S. Application Data", Line 1, delete item "(60)" and insert item -- (63) --, therefor.

On the Title Page, item (56), under "U.S. PATENT DOCUMENT", in Column 1, Line 3, delete "Bhattia" and insert -- Bhatti et al. --, therefor.

In the Specification

In Column 3, Line 23, delete "EMBODIMENT" and insert -- EMBODIMENTS --, therefor.

Signed and Sealed this
Twenty-ninth Day of April, 2014

Michelle K. Lee
*Deputy Director of the United States Patent and Trademark Office*